(12) United States Patent
Xu et al.

(10) Patent No.: US 11,539,456 B2
(45) Date of Patent: Dec. 27, 2022

(54) CIRCULAR BUFFER BASED HYBRID AUTOMATIC RETRANSMISSION REQUEST FOR POLAR CODES

(71) Applicant: QUALCOMM Incorporated, San Diego, CA (US)

(72) Inventors: Changlong Xu, Beijing (CN); Kai Chen, Shenzhen (CN); Jing Jiang, San Diego, CA (US); Gabi Sarkis, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/759,255

(22) PCT Filed: Nov. 20, 2018

(86) PCT No.: PCT/CN2018/116349
§ 371 (c)(1),
(2) Date: Apr. 24, 2020

(87) PCT Pub. No.: WO2019/101057
PCT Pub. Date: May 31, 2019

(65) Prior Publication Data
US 2020/0374034 A1 Nov. 26, 2020

(30) Foreign Application Priority Data
Nov. 22, 2017 (WO) ................ PCT/CN2017/112272

(51) Int. Cl.
*H04L 1/18* (2006.01)
*H04L 1/00* (2006.01)
*H04L 1/08* (2006.01)

(52) U.S. Cl.
CPC .......... *H04L 1/0013* (2013.01); *H04L 1/0057* (2013.01); *H04L 1/08* (2013.01);
(Continued)

(58) Field of Classification Search
None
See application file for complete search history.

(56) References Cited

U.S. PATENT DOCUMENTS 7,924,763 B2   4/2011  Nimbalker et al.
2004/0037224 A1  2/2004  Choi et al.
(Continued)

FOREIGN PATENT DOCUMENTS

CN   101183875 A   5/2008
CN   101388748 A   3/2009
(Continued)

OTHER PUBLICATIONS

U.S. Appl. No. 62/586,447, filed Nov. 15, 2107 by IDACH Holdings, Inc. and titled URLCC transmission with polar codes; (Year: 2017).*
(Continued)

*Primary Examiner* — The Hy Nguyen
(74) *Attorney, Agent, or Firm* — Patterson + Sheridan, L.L.P.

(57) ABSTRACT

Certain aspects of the present disclosure generally relate to wireless communications and, more particularly, to methods and apparatus for rate-matching a stream of bits encoded using polar codes. An exemplary method generally includes determining a target coding rate, $R_T$, for transmitting a group of K information bits, based on a first coding rate, $R_1$, corresponding to a first target block error rate (BLER) for a first transmission of a first redundancy version (RV) of the packet and a second coding rate, $R_2$, corresponding to a second target BLER for a last transmission of a last RV of the packet; determining a circular buffer size, N, of a circular buffer for use in transmitting the first RV and the last RV of the packet; generating encoded information bits from the K information bits using a polar code having a mother code size of N; writing the encoded information bits to the
(Continued)

circular buffer; determining a maximum number of retransmissions, based on a latency requirement for the packet; generating different RVs from the encoded information bits in the circular buffer, each RV based on a corresponding target BLER; and transmitting the first RV via a wireless medium.

20 Claims, 12 Drawing Sheets

(52) U.S. Cl.
CPC .......... *H04L 1/1819* (2013.01); *H04L 1/1825* (2013.01); *H04L 1/1874* (2013.01)

(56) References Cited

U.S. PATENT DOCUMENTS

| | | | | |
|---|---|---|---|---|
| 2005/0149843 | A1* | 7/2005 | Shen | H03M 13/1102 714/800 |
| 2006/0203933 | A1* | 9/2006 | Yu | H04L 1/1845 375/295 |
| 2008/0209297 | A1* | 8/2008 | Chandra | H04L 1/1848 714/748 |
| 2008/0320353 | A1* | 12/2008 | Blankenship | H04L 1/1819 714/746 |
| 2009/0232101 | A1* | 9/2009 | Papasakellariou | H04W 52/48 370/335 |
| 2010/0199157 | A1* | 8/2010 | Takaoka | H04L 1/1819 714/800 |
| 2016/0191225 | A1* | 6/2016 | Hwang | H04L 1/1845 370/330 |
| 2017/0207884 | A1 | 7/2017 | Jiang et al. | |
| 2018/0035409 | A1* | 2/2018 | Chmiel | H04L 1/0067 |
| 2019/0013901 | A1* | 1/2019 | Nimbalker | H04L 1/1896 |
| 2020/0244395 | A1* | 7/2020 | Sun | H04L 1/1896 |
| 2020/0287659 | A1* | 9/2020 | Ye | H04L 1/0071 |

FOREIGN PATENT DOCUMENTS

| | | |
|---|---|---|
| CN | 101809885 A | 8/2010 |
| CN | 103428836 A | 12/2013 |
| CN | 105009541 A | 10/2015 |
| WO | 2017131813 A1 | 8/2017 |

OTHER PUBLICATIONS

International Search Report and Written Opinion—PCT/CN2017/112272—ISA/EPO—dated Aug. 29, 2018.
International Search Report and Written Opinion—PCT/CN2018/116349—ISA/EPO—dated Feb. 21, 2019.
Lee K-H., et al., "Throughput-Efficient Data Transmission Algorithm with QoS Support for Type-II Hybrid ARQ", AEU—International Journal of Electronics and Communications, Elsevier, Amsterdam, NL, vol. 64, No. 8, Jun. 17, 2009 (Jun. 17, 2009), pp. 779-783, XP086147029, ISSN: 1434-8411, DOI: 10.1016/J.AEUE.2009.05.002 [retrieved on Jun. 17, 2009] Section 1 "Introduction" and section 2 "Proposed data transmission algorithm", pp. 779-781, figure 1, Section 4 "Conclusion" p. 782.
Mohammadi M.S., et al., "Simple Hybrid ARQ Schemes Based on Systematic Polar Codes for IoT Applications", IEEE Communications Letters, IEEE Service Center, Piscataway, NJ, US, vol. 21, No. 5, May 1, 2017 (May 1, 2017), 4 Pages, XP011648340, pp. 975-978, ISSN: 1089-7798, DOI: 10.1109/LCOMM.2017.2662012 [retrieved on May 6, 2017] Section III "Proposed H-ARQ schemes", pp. 976-977, figure 1.
Supplementary European Search Report—EP18880571—Search Authority—Munich—dated Jul. 7, 2021.
Tavildar S.R., "A H-ARQ Scheme for Polar Codes", arxiv.org, Cornell University Library, 201 Olin Library Cornell University Ithaca, NY, 14853, Jun. 28, 2016 (Jun. 28, 2016), 5 Pages, XP080711291, From beginning of section I "Introduction" to end of section III "Subset polar code construction", pp. 1-2, From beginning of section IV.A "H-ARQ design principles" to end of section IV.C "Modification to initial construction of subset polar code", pp. 2-3.
Nokia, "LS on Channel Coding", 3GPP TSG RAN WG1 Meeting #90, R1-1715297, Prague, Czech Republic, Aug. 21-25, 2017, 18 Pages.

\* cited by examiner

CIRCULAR BUFFER BASED HYBRID AUTOMATIC RETRANSMISSION REQUEST FOR POLAR CODES

CROSS-REFERENCE TO RELATED APPLICATIONS

This application for Patent is a national stage application under 35 U.S.C. § 371 of PCT/CN2018/116349, filed Nov. 20, 2018, which claims benefit of and priority to International Patent Cooperation Treaty Application No. PCT/CN2017/112272, filed Nov. 22, 2017, which are both assigned to the assignee hereof and hereby expressly incorporated by reference herein in their entireties fully set forth below and for all applicable purposes.

BACKGROUND

Field of the Disclosure

Certain aspects of the present disclosure generally relate to wireless communications and, more particularly, to methods and apparatus for circular buffer based hybrid automatic retransmission request (HARQ) for use with polar code.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an e NodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications in a wireless network.

Certain aspects of the present disclosure provide a method for wireless communications in a network. The method generally includes determining a target coding rate, $R_T$, for transmitting a group of K information bits, based on a first coding rate, $R_1$, corresponding to a first target block error rate (BLER) for a first transmission of a first redundancy version (RV) of the group and a second coding rate, $R_2$, corresponding to a second target BLER for a last transmission of a last RV of the group; determining a circular buffer size, N, of a circular buffer for use in transmitting the first RV and the last RV of the group; generating encoded information bits from the K information bits using a polar code having a mother code size of N; writing the encoded information bits to the circular buffer; determining a maximum number of retransmissions, based on a latency requirement for the group; generating different RVs from the encoded information bits in the circular buffer, each RV based on a corresponding target BLER; and transmitting the first RV via a wireless medium.

Certain aspects of the present disclosure provide an apparatus for wireless communications in a network. The apparatus generally includes at least one processor configured to determine a target coding rate, $R_T$, for transmitting a group of K information bits, based on a first coding rate, $R_1$, corresponding to a first target block error rate (BLER) for a first transmission of a first redundancy version (RV) of the group and a second coding rate, $R_2$, corresponding to a second target BLER for a last transmission of a last RV of the group; to determine a circular buffer size, N, of a circular buffer for use in transmitting the first RV and the last RV of the group; to generate encoded information bits from the K information bits using a polar code having a mother code size of N; to write the encoded information bits to the circular buffer; to determine a maximum number of retransmissions, based on a latency requirement for the group; to generate different RVs from the encoded information bits in the circular buffer, each RV based on a corresponding target BLER; and to transmit the first RV via a wireless medium. The apparatus also generally includes a memory coupled with the at least one processor.

Certain aspects of the present disclosure provide an apparatus for wireless communications in a network. The apparatus generally includes means for determining a target coding rate, $R_T$, for transmitting a group of K information bits, based on a first coding rate, $R_1$, corresponding to a first target block error rate (BLER) for a first transmission of a first redundancy version (RV) of the group and a second coding rate, $R_2$, corresponding to a second target BLER for a last transmission of a last RV of the group; means for determining a circular buffer size, N, of a circular buffer for use in transmitting the first RV and the last RV of the group; means for generating encoded information bits from the K information bits using a polar code having a mother code size of N; means for writing the encoded information bits to the circular buffer; means for determining a maximum number of retransmissions, based on a latency requirement for the group; generating different RVs from the encoded information bits in the circular buffer, each RV based on a corresponding target BLER; and means for transmitting the first RV via a wireless medium.

Certain aspects of the present disclosure provide a non-transitory computer-readable medium for wireless communications in a network. The non-transitory computer-readable medium generally includes instructions that, when executed by at least one processor, cause the at least one processor to perform operations comprising: determining a target coding rate, $R_T$, for transmitting a group of K information bits, based on a first coding rate, $R_1$, corresponding to a first target block error rate (BLER) for a first transmission of a first redundancy version (RV) of the group and a second coding rate, $R_2$, corresponding to a second target BLER for a last transmission of a last RV of the group; determining a circular buffer size, N, of a circular buffer for use in transmitting the first RV and the last RV of the group; generating encoded information bits from the K information bits using a polar code having a mother code size of N; writing the encoded information bits to the circular buffer; determining a maximum number of retransmissions, based on a latency requirement for the group; generating different RVs from the encoded information bits in the circular buffer, each RV based on a corresponding target BLER; and transmitting the first RV via a wireless medium.

Numerous other aspects are provided including methods, apparatus, systems, computer program products, and processing systems.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
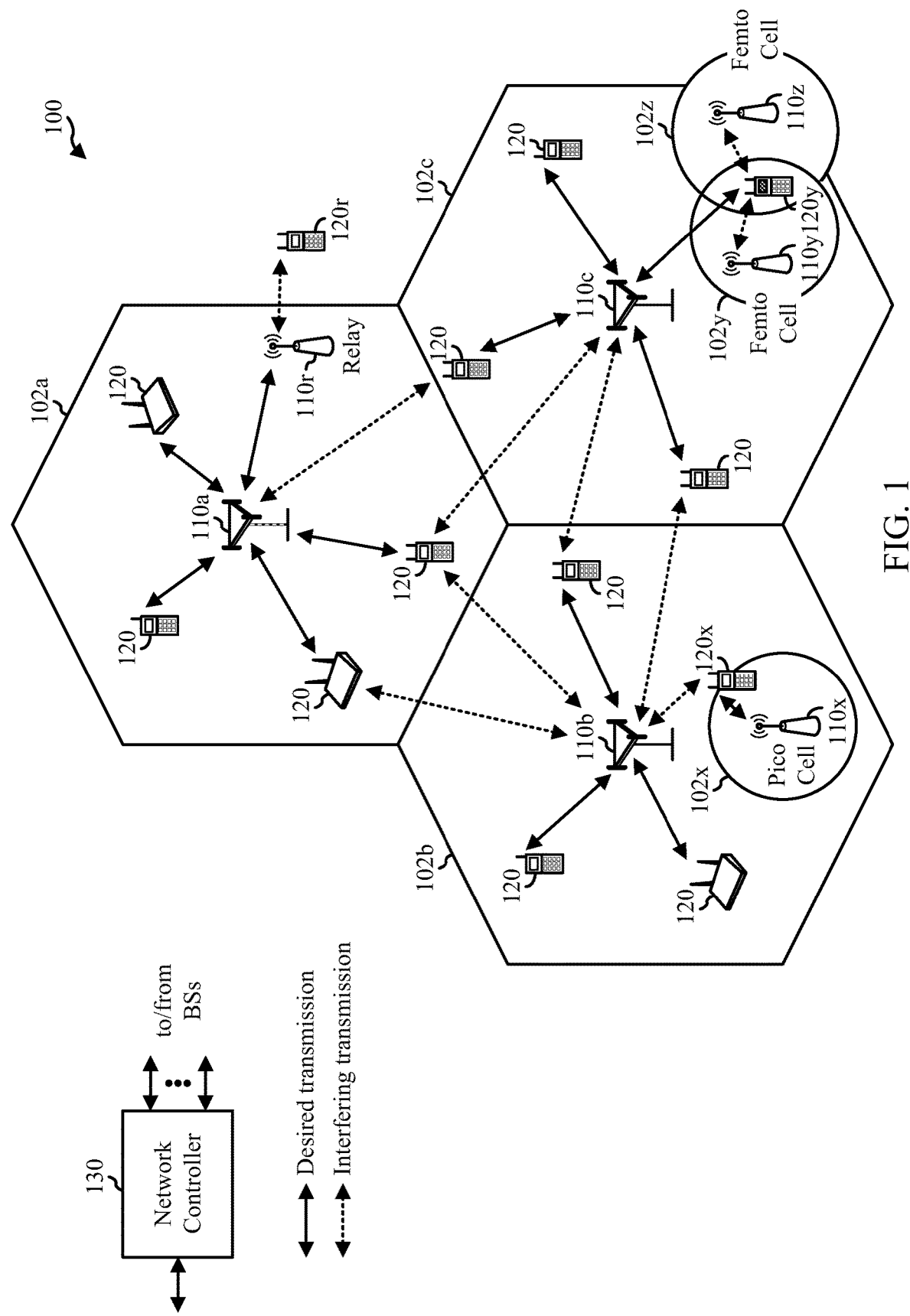
FIG. 1 is a block diagram conceptually illustrating an example telecommunications system, in accordance with certain aspects of the present disclosure.

Aspects of the present disclosure provide apparatus, methods, processing systems, and computer readable mediums for multi-slice networks, such as new radio (NR) (new radio access technology or 5G technology).

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may include Enhanced mobile broadband (eMBB) services targeting wide bandwidth (e.g., 80 MHz and larger) communications, millimeter wave (mmW) services targeting high carrier frequency (e.g., 27 GHz and higher) communications, massive machine-type communications (mMTC) services targeting non-backward compatible machine-type communications (MTC) techniques, and mission critical services targeting ultra reliable low latency communications (URLLC). These services may include latency and reliability requirements. These services may also have different transmission time intervals (TTIs) to meet respective quality of service (QoS) requirements. In addition, these services may co-exist in the same subframe.

Aspects of the present disclosure relate to a circular buffer based hybrid automatic retransmission request (HARQ) scheme for use with polar codes. HARQ is a technique used in wireless communications in which information is retransmitted to a receiver if the transmitter does not receive an acknowledgment (ACK) of the information from the receiver. In some HARQ techniques, a transmitter encodes the same information in different versions, referred to as redundancy versions (RVs). The transmitter transmits a first RV of the information, and, if the transmitter does not receive an ACK of the information, the transmitter transmits a second RV of the information. A receiver receives the transmissions, stores the transmissions, and attempts to recover (e.g., by decoding) the information from the transmissions. The receiver may also combine the different versions (i.e., the RVs) from the transmissions, and may recover the information from the combination of transmissions (i.e., the combination of different RVs) when the receiver was not able to successfully recover the information from any single transmission (i.e., any single RV).

According to aspects of the present disclosure, a device may use polar encoding to encode information bits into a circular buffer and then generate redundancy versions of the encoded bits for transmission by reading out the encoded bits from the circular buffer.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies, such as a 5G nextgen/NR network.

Example Wireless Communications System

FIG. 1 illustrates an example wireless network 100, such as a new radio (NR) or 5G network, in which aspects of the present disclosure may be performed, for example, for improving device discovery in a multi-slice network. In some cases, the network 100 may be a multi-slice network, each slice defines as a composition of adequately configured network functions, network applications, and underlying cloud infrastructures that are bundled together to meet the requirement of a specific use case or business model.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATS. In some cases, NR or 5G RAT networks may be deployed, employing a multi-slice network architecture.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR/5G.

NR may utilize OFDM with a CP on the uplink and downlink and include support for half-duplex operation using TDD. A single component carrier bandwidth of 100 MHz may be supported. NR resource blocks may span 12 sub-carriers with a sub-carrier bandwidth of 75 kHz over a 0.1 ms duration. Each radio frame may consist of 2 half frames, each half frame consisting of 5 subframes, with a length of 10 ms. Consequently, each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with reference to FIGS. 9 and 10. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time—frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
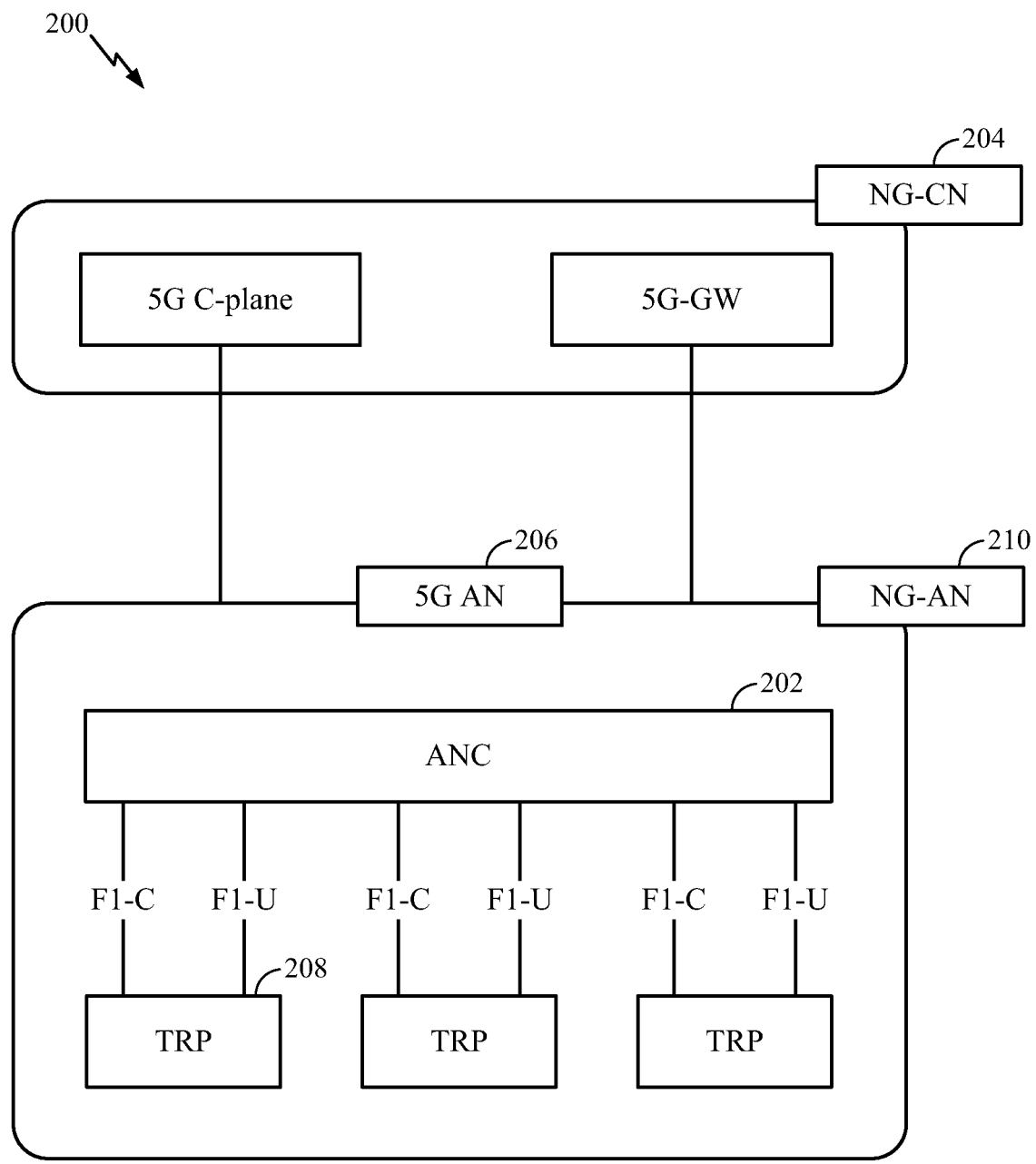
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
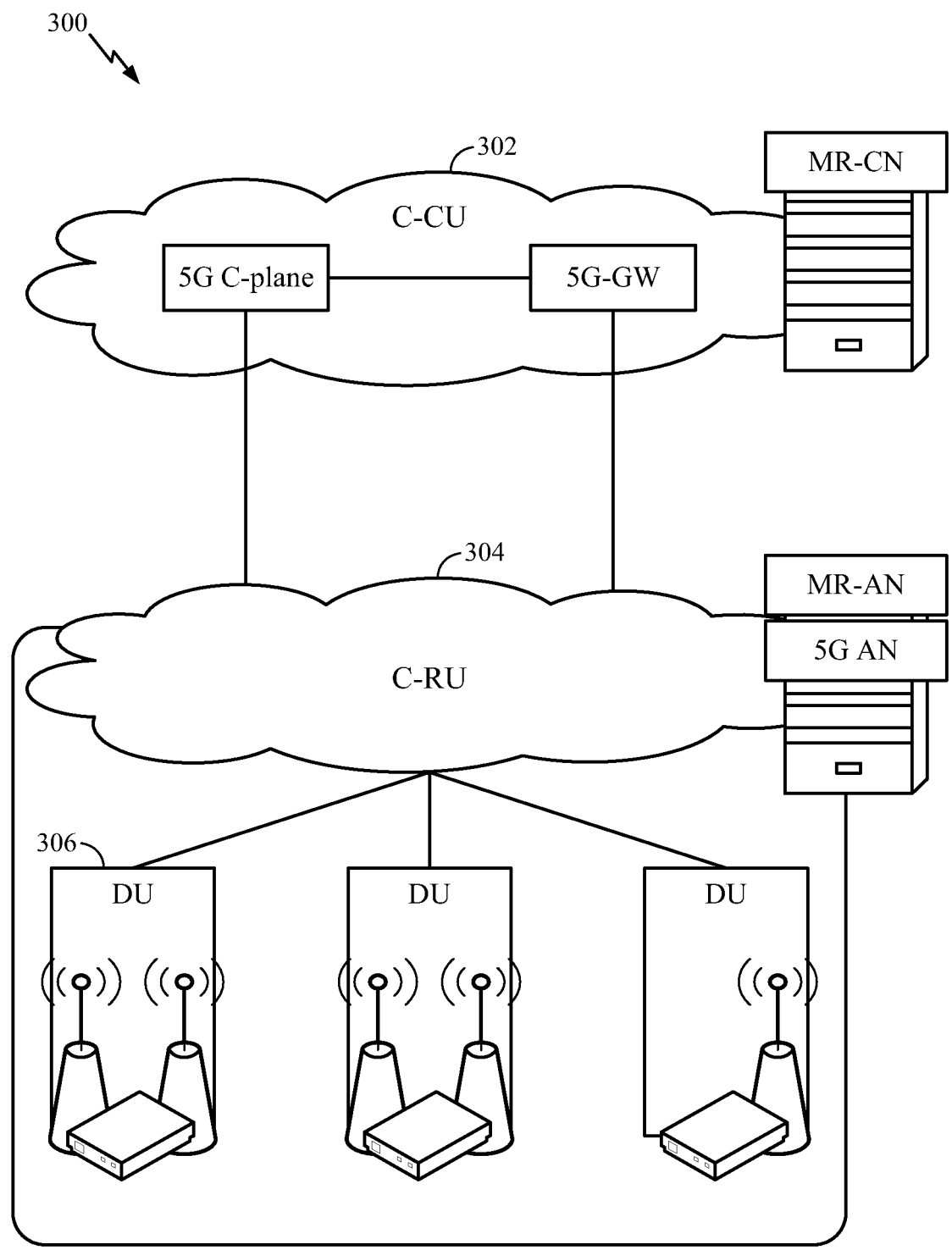
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
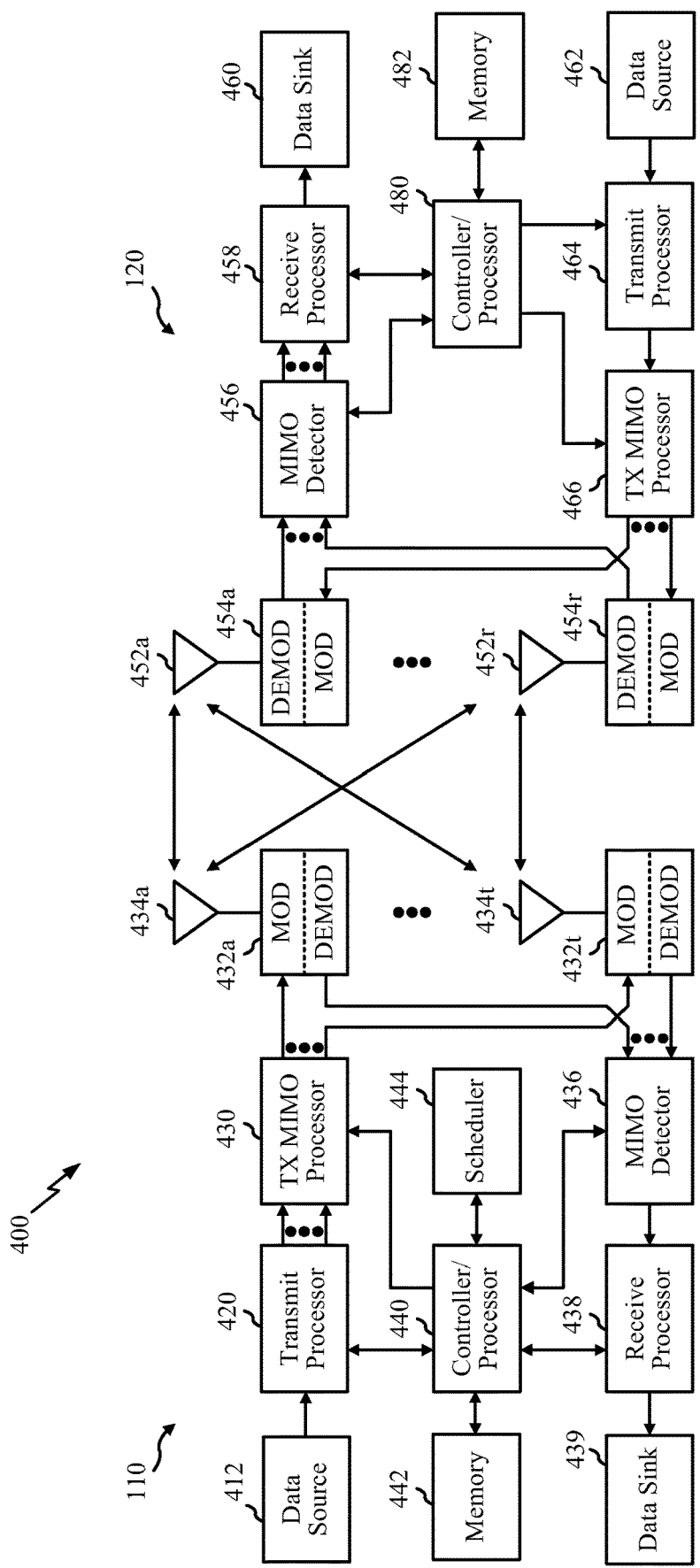
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIG. 11.

According to aspects, for a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIG. 6, and/or other processes for the techniques described herein. The processor 480 and/or other processors and modules at the UE 120 may also perform or direct, e.g., the execution of the functional blocks illustrated in FIG. 7, and/or other processes for the techniques described herein. The memories 442 and 482 may store data and program codes for the BS 110 and the UE 120, respectively. A scheduler 444 may schedule UEs for data transmission on the downlink and/or uplink.

Figure 5:
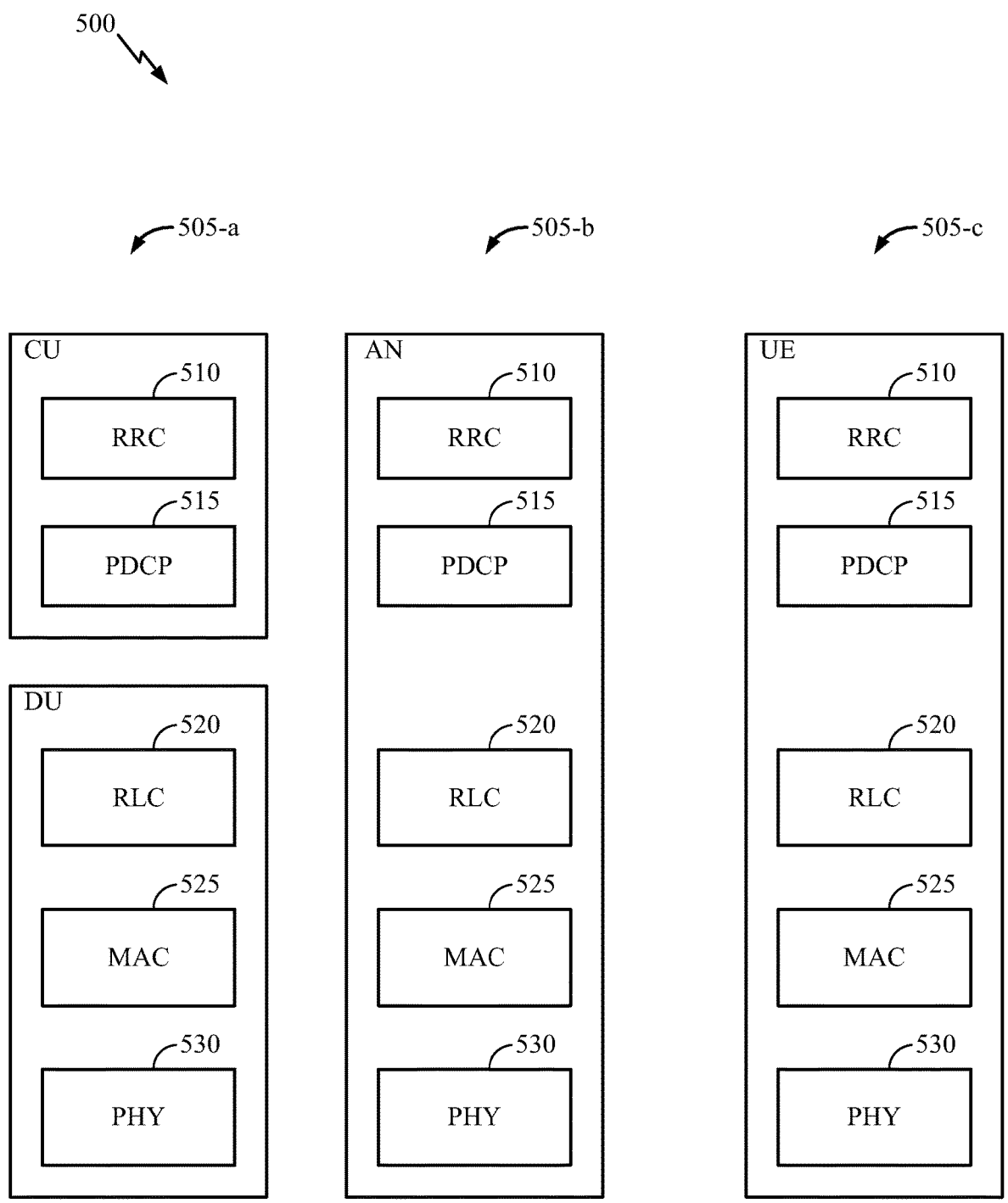
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack 505-c (e.g., the RRC layer 510, the PDCP layer 515, the RLC layer 520, the MAC layer 525, and the PHY layer 530).

Figure 6:
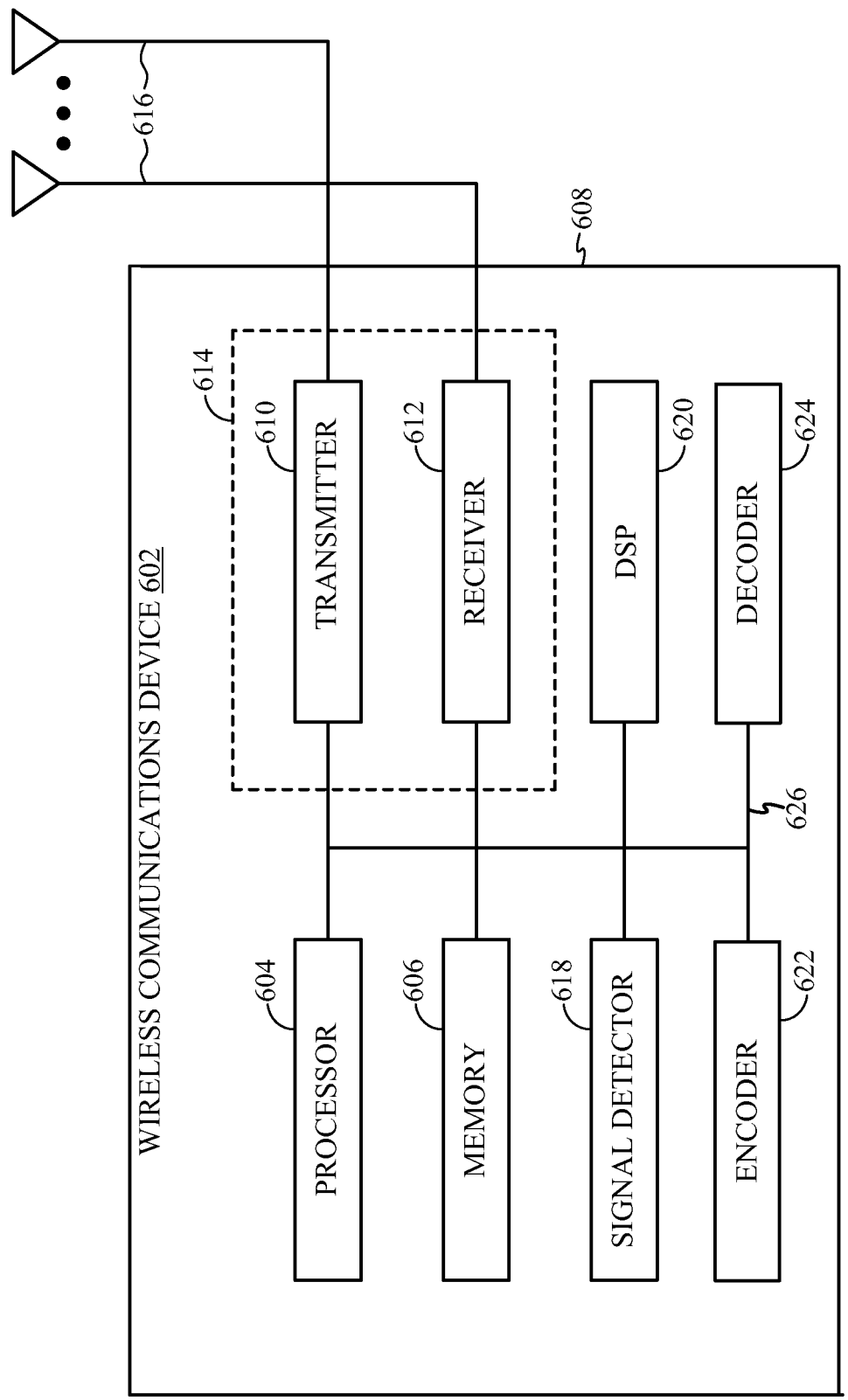
FIG. 6 illustrates a block diagram of an example wireless device in accordance with certain aspects of the present disclosure.

FIG. 6 illustrates various components that may be utilized in a wireless communications device 602 that may be employed within the wireless communication system from FIG. 1. The wireless communications device 602 is an example of a device that may be configured to implement the various methods described herein. The wireless communications device 602 may be an BS 110 from FIG. 1 or any of user equipments 120.

The wireless communications device 602 may include a processor 604 which controls operation of the wireless communications device 602. The processor 604 may also be referred to as a central processing unit (CPU). Memory 606, which may include both read-only memory (ROM) and random access memory (RAM), provides instructions and data to the processor 604. A portion of the memory 606 may also include non-volatile random access memory (NVRAM). The processor 604 typically performs logical and arithmetic operations based on program instructions stored within the memory 606. The instructions in the memory 606 may be executable to implement the methods described herein.

The wireless communications device 602 may also include a housing 608 that may include a transmitter 610 and a receiver 612 to allow transmission and reception of data between the wireless device 602 and a remote location. The transmitter 610 and receiver 612 may be combined into a transceiver 614. A single or a plurality of transmit antennas 616 may be attached to the housing 608 and electrically coupled to the transceiver 614. The wireless communications device 602 may also include (not shown) multiple transmitters, multiple receivers, and multiple transceivers.

The wireless communications device 602 may also include a signal detector 618 that may be used in an effort to detect and quantify the level of signals received by the transceiver 614. The signal detector 618 may detect such signals as total energy, energy per subcarrier per symbol, power spectral density and other signals. The wireless communications device 602 may also include a digital signal processor (DSP) 620 for use in processing signals.

Additionally, the wireless communications device 602 may also include an encoder 622 for use in encoding signals for transmission. The encoder may also store the encoded signals in a circular buffer (not shown) and perform rate matching on the encoded signals (e.g., by implementing operations 1100, shown in FIG. 11). Further, the wireless communication device 602 may include a decoder 624 for use in decoding received signals.

The various components of the wireless communications device 602 may be coupled together by a bus system 626, which may include a power bus, a control signal bus, and a status signal bus in addition to a data bus. The processor 604 may be configured to access instructions stored in the memory 606 to perform connectionless access, in accordance with aspects of the present disclosure discussed below.

Figure 7:
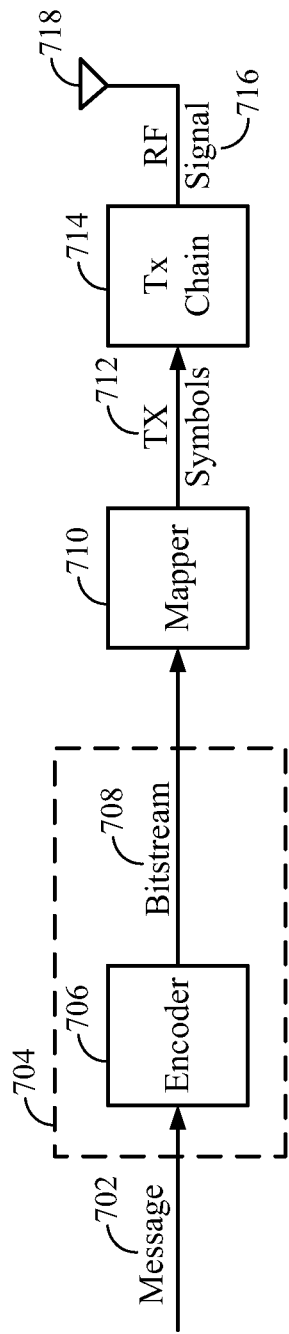
FIG. 7 is a simplified block diagram illustrating a encoder, in accordance with certain aspects of the present disclosure.

FIG. 7 is a simplified block diagram illustrating an encoder, in accordance with certain aspects of the present disclosure. FIG. 7 illustrates a portion of a radio frequency (RF) modem 704 that may be configured to provide an encoded message for wireless transmission (e.g., using polar codes described below). In one example, an encoder 706 in a wireless device (e.g., BS 110 or a UE 120) receives a message 702 for transmission. The message 702 may contain data and/or encoded voice or other content directed to the receiving device. The encoder 706 encodes the message using a suitable modulation and coding scheme (MCS), typically selected based on a configuration defined by the BS 110 or another network entity. The encoded bitstream 708 may then be stored in circular buffer and rate-matching may be performed on the stored encoded bitstream, for example, according to aspects of the present disclosure described in more detail below. After the encoded bitstream 708 is rate-matched, the encoded bitstream 708 may then be provided to a mapper 710 that generates a sequence of TX symbols 712 that are modulated, amplified and otherwise processed by TX chain 714 to produce an RF signal 716 for transmission through antenna 718.

Figure 8:
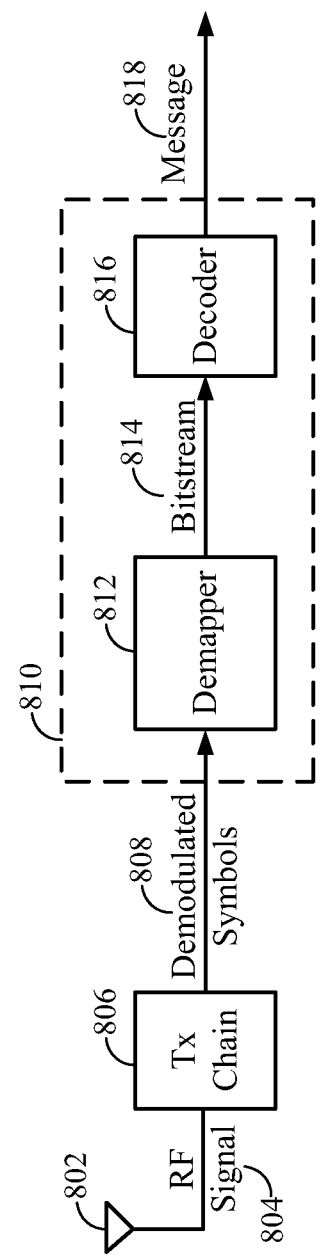
FIG. 8 is a simplified block diagram illustrating a decoder, in accordance with certain aspects of the present disclosure.

FIG. 8 is a simplified block diagram illustrating a decoder, in accordance with certain aspects of the present disclosure. FIG. 8 illustrates a portion of a RF modem 810 that may be configured to receive and decode a wirelessly transmitted signal including an encoded message (e.g., a message encoded using a polar code as described below). In various examples, the modem 810 receiving the signal may reside at a user equipment, at a base station, or at any other suitable apparatus or means for carrying out the described functions. An antenna 802 provides an RF signal 716 (i.e., the RF signal produced in FIG. 7) to an access terminal (e.g., UE 120). An RX chain 806 processes and demodulates the RF signal 716 and may provide a sequence of symbols 808 to a demapper 812, which produces a bitstream 814 representative of the encoded message.

A decoder 816 may then be used to decode m-bit information strings from a bitstream that has been encoded using a coding scheme (e.g., a Polar code). The decoder 816 may comprise a Viterbi decoder, an algebraic decoder, a butterfly decoder, or another suitable decoder. In one example, a Viterbi decoder employs the well-known Viterbi algorithm to find the most likely sequence of signaling states (the Viterbi path) that corresponds to a received bitstream 814. The bitstream 814 may be decoded based on a statistical analysis of LLRs calculated for the bitstream 814. In one example, a Viterbi decoder may compare and select the correct Viterbi path that defines a sequence of signaling states using a likelihood ratio test to generate LLRs from the bitstream 814. Likelihood ratios can be used to statistically compare the fit of a plurality of candidate Viterbi paths using a likelihood ratio test that compares the logarithm of a likelihood ratio for each candidate Viterbi path (i.e. the LLR) to determine which path is more likely to account for the sequence of symbols that produced the bitstream 814. The decoder 816 may then decode the bitstream 814 based on the LLRs to determine the message 818 containing data and/or encoded voice or other content transmitted from the base station (e.g., BS 110).

Figure 9:
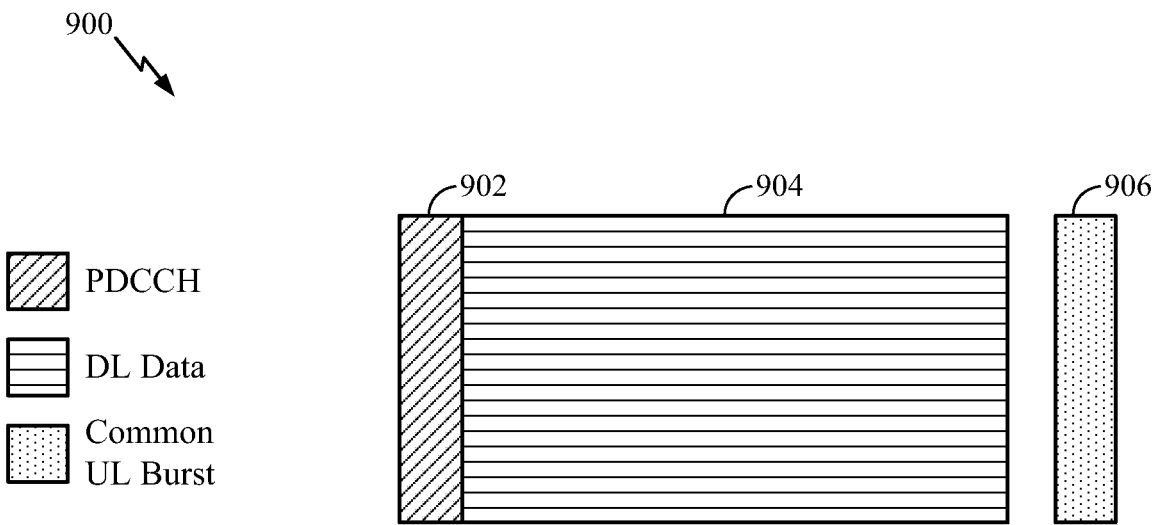
FIG. 9 illustrates an example of a DL-centric subframe, in accordance with certain aspects of the present disclosure.

FIG. 9 is a diagram 900 showing an example of a DL-centric subframe, which may be used by one or more devices (e.g., BS 110 and/or UE 120) to communicate in the wireless network 100. The DL-centric subframe may include a control portion 902. The control portion 902 may exist in the initial or beginning portion of the DL-centric subframe. The control portion 902 may include various scheduling information and/or control information corresponding to various portions of the DL-centric subframe. In some configurations, the control portion 902 may be a physical DL control channel (PDCCH), as indicated in FIG. 9. The DL-centric subframe may also include a DL data portion 904. The DL data portion 904 may sometimes be referred to as the payload of the DL-centric subframe. The DL data portion 904 may include the communication resources utilized to communicate DL data from the scheduling entity (e.g., UE or BS) to the subordinate entity (e.g., UE). In some configurations, the DL data portion 904 may be a physical DL shared channel (PDSCH).

The DL-centric subframe may also include a common UL portion 906. The common UL portion 906 may sometimes be referred to as an UL burst, a common UL burst, and/or various other suitable terms. The common UL portion 906 may include feedback information corresponding to various other portions of the DL-centric subframe. For example, the common UL portion 906 may include feedback information corresponding to the control portion 902. Non-limiting examples of feedback information may include an ACK signal, a NACK signal, a HARQ indicator, and/or various other suitable types of information. The common UL portion 906 may include additional or alternative information, such as information pertaining to random access channel (RACH) procedures, scheduling requests (SRs), and various other suitable types of information. As illustrated in FIG. 9, the end of the DL data portion 904 may be separated in time from the beginning of the common UL portion 906. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 10:
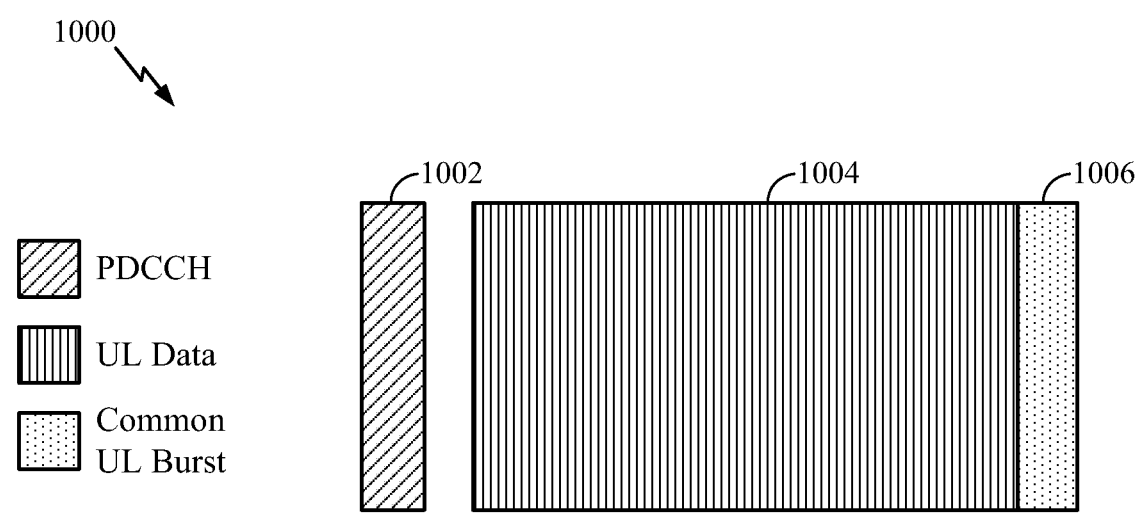
FIG. 10 illustrates an example of an UL-centric subframe, in accordance with certain aspects of the present disclosure.

FIG. 10 is a diagram 1000 showing an example of an UL-centric subframe, which may be used by one or more devices (e.g., BS 110 and/or UE 120) to communicate in the wireless network 100. The UL -centric subframe may include a control portion 1002. The control portion 1002 may exist in the initial or beginning portion of the UL-centric subframe. The control portion 1002 in FIG. 10 may be similar to the control portion described above with reference to FIG. 9. The UL-centric subframe may also include an UL data portion 1004. The UL data portion 1004 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 1002 may be a physical DL control channel (PDCCH).

As illustrated in FIG. 10, the end of the control portion 1002 may be separated in time from the beginning of the UL data portion 1004. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 1006. The common UL portion 1006 in FIG. 10 may be similar to the common UL portion 1006 described above with reference to FIG. 10. The common UL portion 1006 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Polar Codes

As noted above, polar codes may be used to encode a stream of bits for transmission. Polar codes are the first provably capacity-achieving coding scheme with almost linear (in block length) encoding and decoding complexity. Polar codes are widely considered as a candidate for error-correction in the next-generation wireless systems. Polar codes have many desirable properties such as deterministic construction (e.g., based on a fast Hadamard transform), very low and predictable error floors, and simple successive-cancellation (SC) based decoding.

Polar codes are linear block codes of length $N=2^n$ where their generator matrix is constructed using the $n^{th}$ Kronecker power of the matrix $$G = \begin{pmatrix} 1 & 0 \\ 1 & 1 \end{pmatrix},$$

denoted by $G^n$, also referred to as a Hadamard matrix of order n. For example, Equation (1) shows the resulting generator matrix for n=3.

$$G^{\otimes 3} = \begin{bmatrix} 1 & 0 & 0 & 0 & 0 & 0 & 0 & 0 \\ 1 & 1 & 0 & 0 & 0 & 0 & 0 & 0 \\ 1 & 0 & 1 & 0 & 0 & 0 & 0 & 0 \\ 1 & 1 & 1 & 1 & 0 & 0 & 0 & 0 \\ 1 & 0 & 0 & 0 & 1 & 0 & 0 & 0 \\ 1 & 1 & 0 & 0 & 1 & 1 & 0 & 0 \\ 1 & 0 & 1 & 0 & 1 & 0 & 1 & 0 \\ 1 & 1 & 1 & 1 & 1 & 1 & 1 & 1 \end{bmatrix} \quad \text{Eq. (1)}$$

According to certain aspects, a codeword may be generated (e.g., by a BS) by using the generator matrix to encode a number of input bits (e.g., information bits). For example, given a number of input bits $u=(u_0, u_1, u_{N-1})$, a resulting codeword vector $x=(x_0, x_1, \ldots, x_{N-1})$ may be generated by encoding the input bits using the generator matrix G. This resulting codeword may then be rate matched (e.g., using techniques described herein) and transmitted by a base station over a wireless medium and received by a UE.

When the received vectors are decoded (e.g., by the UE) using a Successive Cancellation (SC) decoder (e.g., decoder 816), every estimated bit, $\hat{u}_i$, has a predetermined error probability given that bits $u_0^{i-1}$ were correctly decoded, that tends towards either 0 or 0.5. Moreover, the proportion of estimated bits with a low error probability tends towards the capacity of the underlying channel. Polar codes exploit a phenomenon called channel polarization by using the most reliable K bits to transmit information, while setting, or freezing, the remaining (N-K) bits to a predetermined value, such as 0, for example as explained below.

For very large N, polar codes transform the channel into N parallel "virtual" channels for the N information bits. If C is the capacity of the channel, then there are almost N*C virtual channels which are completely noise-free and there are N(1−C) virtual channels which are completely noisy. The basic polar coding scheme then involves freezing (i.e., not transmitting) the information bits to be sent along the completely noisy channels and sending information only along the "perfect" channels. For short-to-medium N, this polarization may not be complete in the sense there could be several channels which are neither completely useless (i.e., completely noisy) nor completely noise-free (i.e., channels that are in transition). Depending on the rate of transmission, these channels in transition are either frozen (i.e., not used for transmitting information) or they are used for transmission.

Example Circular Buffer Based Hybrid Automatic Retransmission Request for Polar Codes Aspects of the present disclosure relate to a circular buffer based hybrid automatic retransmission request (HARQ) scheme for use with polar codes. HARQ is a technique used in wireless communications in which information is retransmitted to a receiver if the transmitter does not receive an acknowledgment (ACK) of the information from the receiver. In some HARQ techniques, a transmitter encodes the same information in different versions, referred to as redundancy versions (RVs). The transmitter transmits a first RV of the information, and, if the transmitter does not receive an ACK of the information, the transmitter transmits a second RV of the information. A receiver receives the transmissions, stores the transmissions, and attempts to recover (e.g., by decoding) the information from the transmissions. The receiver may also combine the different versions (i.e., the different RVs) from the transmissions, and may recover the information from the combination of transmissions (i.e., the combination of RVs) when the receiver was not able to successfully recover the information from any single transmission (i.e., from any single RV).

Ultra-reliable low latency communications (URLLC) is a technique that may be used in NR communications. A typical block error rate (BLER) requirement for URLLC is $10^{-5}$, but a BLER as low as $10^{-9}$ may be required for some services or communications. A typical latency requirement for URLLC is 0.5 ms for both uplink and downlink communications.

According to aspects of the present disclosure, to meet requirements of both latency and BLER for URLLC, a maximum number of retransmissions (e.g., HARQ retransmissions) may be limited, as compared to a maximum number of retransmissions for non-URLLC transmissions.

In aspects of the present disclosure, more transmission resources (e.g., time and frequency resources) may be allocated for a last transmission in a set of retransmissions than are allocated for earlier transmissions in the set of retransmissions (e.g., a set of HARQ retransmissions). Using more transmission resources for the last transmission may decrease the error rate (e.g., BLER) for the last retransmission and, hence, the error rate of the set of retransmissions.

According to aspects of the present disclosure, a code rate used in generating a last transmission in a set of retransmissions may be lower than a code rate used for generating earlier transmissions in the set of retransmissions. Using a lower code rate for the last transmission may decrease the error rate (e.g., BLER) for the last retransmission and, hence, the error rate of the set of retransmissions.

HARQ for polar codes based on circular buffers presents design challenges, since locations of information bits are different for different combination of (N, K), wherein N is the coded block size and K is the number of information bits encoded.

Figure 11:
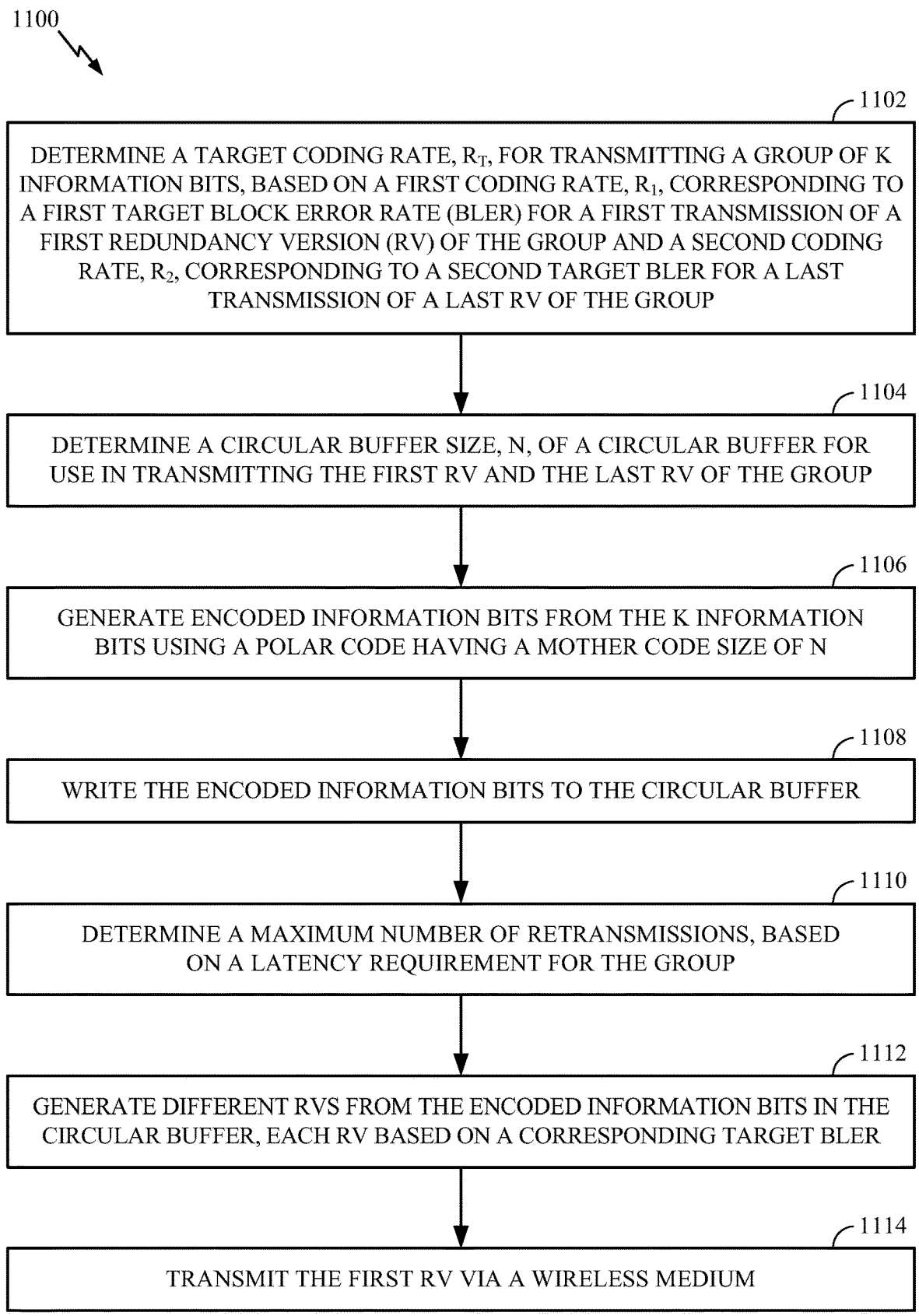
FIG. 11 illustrates example operations for wireless communications, according to aspects of the present disclosure.

FIG. 11 illustrates example operations 1100 for wireless communications, according to aspects of the present disclosure. Operations 1100 may be performed by a wireless device, for example, BS 110 (see FIGS. 1 and 4), TRP 208 (see FIG. 2), DU 306 (see FIG. 3), or UE 120 (see FIGS. 1 and 4).

At block 1102, operations 1100 begin with the wireless device determining a target coding rate, $R_T$, for transmitting a group of K information bits, based on a first coding rate, $R_1$, corresponding to a first target block error rate (BLER) for a first transmission of a first redundancy version (RV) of the group and a second coding rate, $R_2$, corresponding to a second target BLER for a last transmission of a last RV of the group. For example, UE 120 (see FIGS. 1 and 4) determines a target coding rate, $R_T$ (e.g., 2/3), for transmitting a group of K (e.g., 4800) information bits, based on a first coding rate, $R_1$ (e.g., ¾), corresponding to a first target block error rate (BLER, e.g., $10^{-1}$) for a first transmission of a first redundancy version (RV) of the group and a second coding rate, $R_2$ (e.g., ½), corresponding to a second target BLER (e.g., $10^{-5}$) for a last transmission of a last RV of the group.

The wireless device continues operations 1100 at block 1104 by determining a circular buffer size, N, of a circular buffer for use in transmitting the first RV and the last RV of the group. Continuing the example from above, UE 120 determines a circular buffer size, N (e.g., 800), of a circular buffer for use in transmitting the first RV and the last RV (both mentioned in block 1102) of the group.

Operations 1100 continue at block 1106 with the wireless device generating encoded information bits from the K information bits using a polar code having a mother code size of N. Continuing the example from above, UE 120 generates encoded information bits from the K (e.g., 4800) information bits using a polar code having a mother code size of N (determined in block 1104, e.g., 800).

At block 1108, operations 1100 continue with the wireless device writing the encoded information bits to the circular buffer. Continuing the example from above, UE 120 writes the encoded information bits (from block 1106) to the circular buffer.

Operations 1100 continue at block 1110 with the wireless device determining a maximum number of retransmissions, based on a latency requirement for the group. Continuing the example from above, UE 120 determines a maximum number (e.g., four) retransmissions, based on a latency requirement (e.g., maximum latency of twenty milliseconds) for the group (of K information bits, mentioned in block 1102).

At block 1112, operations 1100 continue with the wireless device generating different RVs from the encoded information bits in the circular buffer, each RV based on a corresponding target BLER. Continuing the example from above, UE 120 generates different RVs from the encoded information bits in the circular buffer, each RV based on a corresponding target BLER (e.g., $10^{-1}$, $10^{-2}$, $10^{-3}$, or $10^{-5}$).

Operations 1100 continue at block 1114 with the wireless device transmitting the first RV via a wireless medium. Continuing the example from above, UE 120 transmits the first RV (i.e., of the different RVs from block 1112) via wireless medium (e.g., to BS 110, see FIG. 1).

Figure 12:
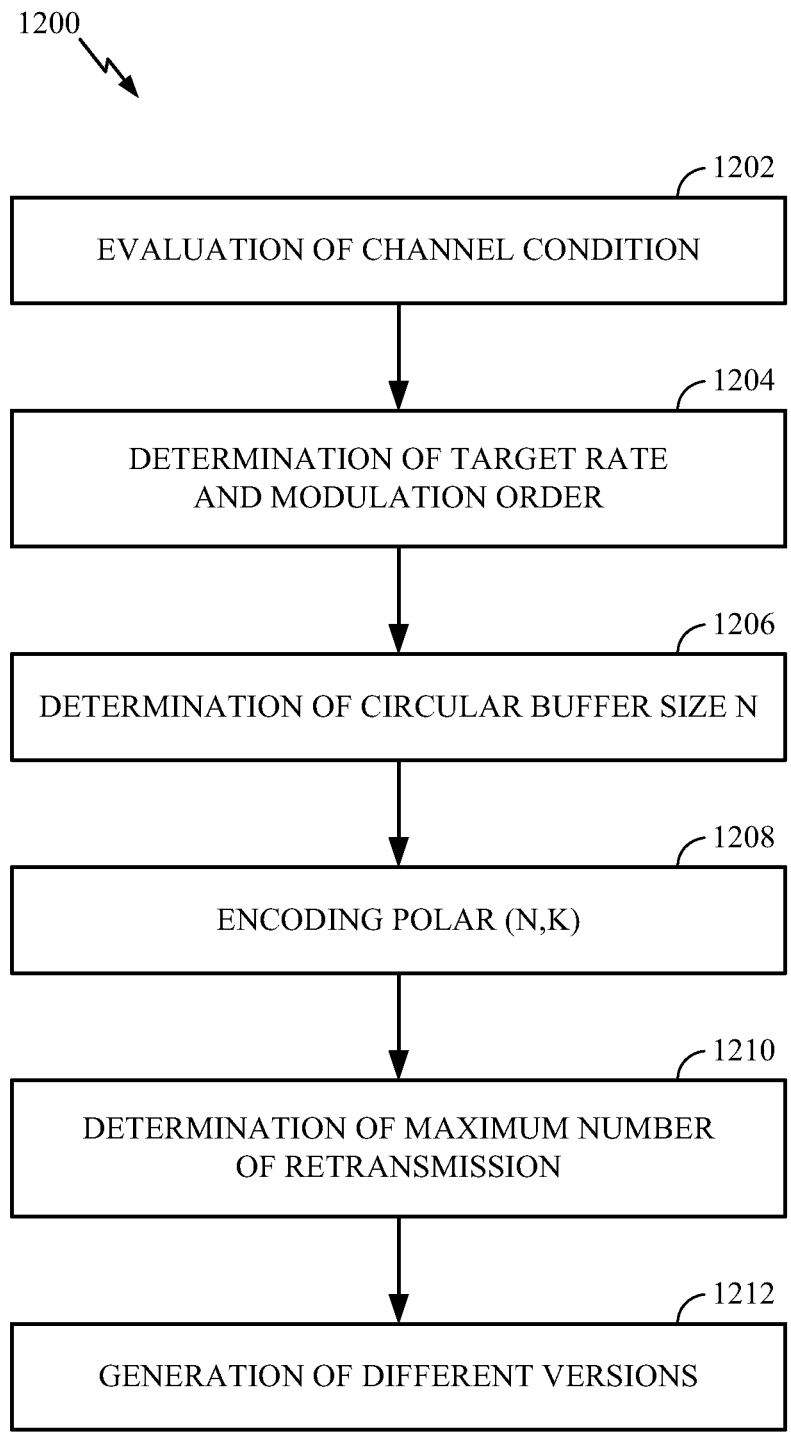
FIG. 12 illustrates an example process for wireless communications, according to aspects of the present disclosure.

FIG. 12 illustrates an example process for wireless communications, according to aspects of the present disclosure. At block 1202, a wireless device (e.g., a UE or a BS) obtains channel conditions (e.g., SNR) for a transmission channel. The channel conditions may be obtained by evaluation of a signal (e.g., a reference signal) transmitted from another wireless device (e.g., a UE) and/or from feedback (e.g., a CSI report) from the other wireless device (e.g., the UE).

The wireless device determines a target rate, $R_T$, and modulation order at block 1204 for transmitting on the transmission channel from block 1202. The target rate may be calculated using the below equation:

$$R_T=(R_1*a+R_2*b)*\beta$$

where $R_1$ is a rate corresponding to a target BLER (e.g., $10^{-1}$) of a first transmission (e.g., of a set of retransmissions), $R_2$ is a rate corresponding to a target BLER (e.g., $10^{-5}$) of a last transmission (e.g., of a set of retransmissions), a is a constant in the range [0, 1], b is a constant in the range [0, 4], and β is a constant in the range [1/3, 4].

At block 1206, according to aspects of the present disclosure, the wireless device determines a circular buffer size, N, using the following algorithm. The wireless device determines a first circular buffer size, $N_R$, by dividing the number of information bits, K, to be transmitted by the minimum coding rate supported by the wireless device, $R_{min}$, and then determining $N_R$ as the minimum integral power of 2 which is not less than $K/R_{min}$. The wireless device determines a second circular buffer size, $N_T$, by dividing K by the target coding rate, $R_T$, and then determining $N_T$ as the minimum integral power of 2 which is not less than $K/R_T$. The wireless device then determines $N_{max}$, the maximum coded block size supported by the device. The wireless device then determines the size of the circular buffer, N, as the minimum of the first circular buffer size, $N_R$, the second circular buffer size, $N_T$, and the maximum coded block size supported by the device, N., i.e., $$N=\min(N_R,N_T,N_{max}).$$

At block 1208, the wireless device encodes the K information bits using a polar code having a mother code of size N.

The wireless device, at block 1210, determines a maximum number of retransmissions of the K information bits, based on a required latency for the transmission of the K information bits.

At block 1212, the wireless device generates different redundancy versions of the encoded information bits.

In aspects of the present disclosure, a typical value for $R_{min}$ is 1/3.

Figure 13:
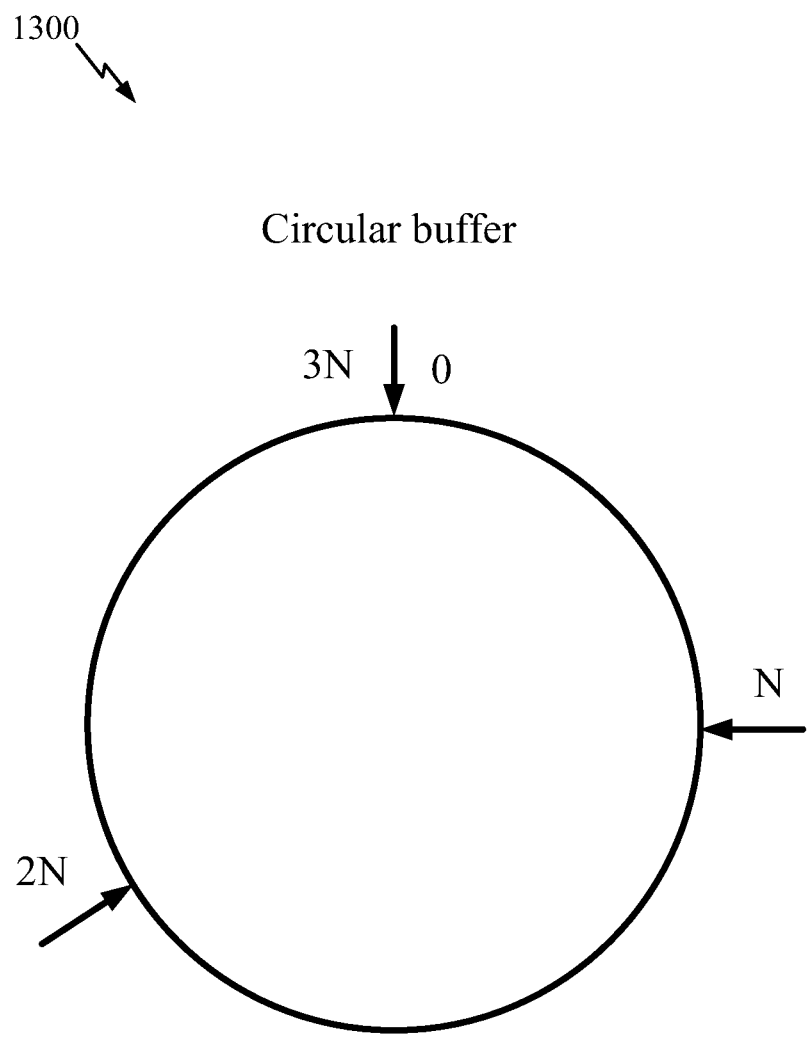
FIG. 13 illustrates an example circular buffer, in accordance with certain aspects of the present disclosure.

FIG. 13 illustrates an exemplary circular buffer 1300, according to aspects of the present disclosure. For example, in LTE, a tail biting convolutional code (TBCC) of rate 1/3 may be used for rate matching control channels and other types of channels, which is typically performed using a circular buffer. In the example, the bits of the channel may be encoded using three polynomials. Still in the example, after encoding a stream of bits, the resultant encoded bits from the three polynomials are put into the circular buffer one by one. For example, with reference to FIG. 13, code bits from the first polynomial are placed in the circular buffer in the range of [0, N−1]. Further, code bits from the second polynomial are placed in the circular buffer in the range of [N, 2N−1], and code bits from the third polynomial are placed in the circular buffer in the range of [2N, 3N−1].

Once the coded bits are stored in the circular buffer, rate matching may be performed. For example, assuming an allocated block size of 'M', if M=3N, then no repetition, puncturing, or shortening (i.e., rate matching) is performed. However, if M>3N, then repetition may be performed clockwise from 3N around the circular buffer. That is, bits starting at position 0 may be repeated in the block of size M, so that every bit in the block was read from the circular buffer. Additionally, if M<3N, then puncturing or shortening may be performed around the circular buffer. When shortening is performed, the first M bits in the circular buffer are written to the block. When puncturing is performed, the last M bits in the circular buffer are written to the block.

Figure 14:
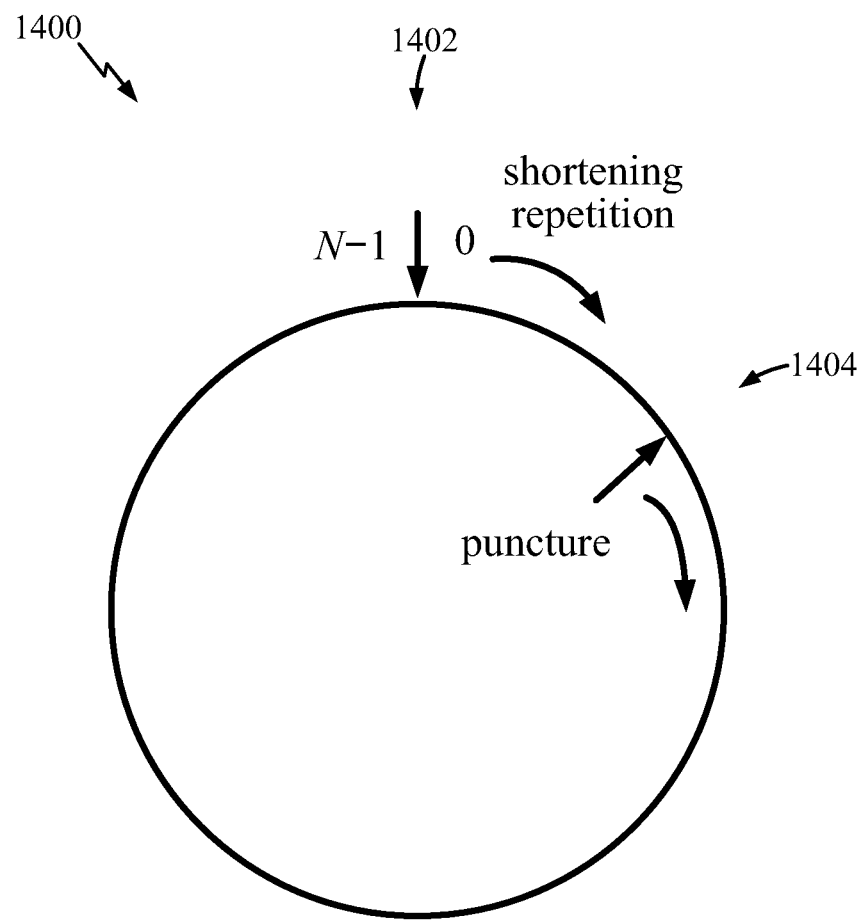
FIG. 14 illustrates usage of a circular buffer, in accordance with aspects of the present disclosure.

FIG. 14 illustrates usage of a circular buffer 1400 for polar encoding K information bits using a circular buffer size of N, in accordance with aspects of the present disclosure. Polar encoding and generation of HARQ RVs of the information bits may be performed based on a maximum number of retransmissions allowed for transmission of the information bits. The maximum number of retransmissions may be determined based on a latency requirement and a BLER requirement for the information bits.

According to aspects of the present disclosure, generation of different versions (e.g., RVs) of the information bits may be performed by reading encoding bits out from the circular buffer. If the bits are to be shortened, then shortening may begin at the starting point 1402 of the circular buffer. If the transmission requires repetition of bits, then the repetition also starts from the starting point 1402 of the circular buffer. If the transmission requires puncturing, then the starting point of the puncturing is from a point N-M bits from the end of the circular buffer 1404, where M is the coded bits supported by transmission resources allocated for transmission of the bits.

In aspects of the present disclosure, each version is self-decodable. That is, any version may be decoded to recover all of the information bits, if the version is received successfully.

According to aspects of the present disclosure, the size of the version of the last retransmission may be larger than the size of one of the first transmissions.

An example of transmitting an URLLC transmission is described below with reference to FIG. 12. At 1202, a wireless device obtains a measure of channel condition (e.g., SNR) by evaluating a signal (e.g., an SRS) from a UE. The wireless device calculates the target rate, $R_T$, at 1204 by using the following formula:

$$R_T=(R1*a+R2*b)*\beta.$$

In the example, a=1, b=0, and β=½. Thus, $R_T=R_1/2$. The wireless device determines $N_T$ by determining the minimum integer power of 2 which is not less than $K/R_T$. The wireless device determines the circular buffer size, N, at 1206 by calculating $N=\min(N_R, N_T, N_{max})$. The wireless device then encodes the information bits and writes them into the circular buffer at 1208. At 1210, the wireless device determines the maximum number of retransmissions to be 2, because of the latency requirements (e.g., 0.5 ms) of the URLLC transmission. At 1212, the wireless device generates two versions for transmission. The first version is obtained by puncturing as the encoded bits are read out from the circular buffer. The second version is 3 times longer than the first version and repeated along the circular buffer.

According to aspects of the present disclosure, the disclosed techniques may be very efficient for polar codes to support HARQ incremental redundancy (HARQ-IR) based on usage of the circular buffer. HARQ-IR is supported very well, because all of the versions are from one mother code.

In aspects of the present disclosure, HARQ-IR, HARQ chase combining (HARQ-CC), hybrid HARQ-IR and hybrid HARQ-CC may be supported with the described polar HARQ with circular buffer.

According to aspects of the present disclosure, the disclosed techniques are very flexible and able to meet the requirements of both ultra-reliability and low latency for URLLC.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

In some cases, rather than actually transmitting a frame, a device may have an interface to output a frame for transmission. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting, means for receiving, means for determining, means for performing (e.g., rate-matching), means for encoding, means for, puncturing, means for repeating, means for shortening, and/or means for generating may comprise one or more processors or antennas at the BS 110 or UE 120, such as the transmit processor 420, controller/processor 440, receive processor 438, or antennas 434 at the BS 110 and/or the transmit processor 464, controller/processor 480, receive processor 458, or antennas 452 at the UE 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications, comprising:
    determining a target coding rate ($R_T$) for transmitting a group of K information bits, based on a first coding rate ($R_1$) corresponding to a first target block error rate (BLER) for a first transmission of a first redundancy version (RV) of the group and a second coding rate ($R_2$) corresponding to a second target BLER for a last transmission of a last RV of the group,
    determining a circular buffer size (N) of a circular buffer for use in transmitting the first RV and the last RV of the group, wherein determining the circular buffer size (N) comprises:
        obtaining a minimum supported coding rate ($R_{min}$);
        calculating a first buffer size ($N_R$) as a minimum integral power of two which is not less than $K/R_{min}$;
        calculating a second buffer size ($N_T$) as a minimum integral power of two which is not less than $K/R_T$;
        obtaining a maximum coded block size ($N_{max}$); and
        calculating N as a minimum of $N_R$, $N_T$, and $N_{max}$;
    generating encoded information bits from the K information bits using a polar code having a mother code size of N;
    writing the encoded information bits to the circular buffer;
    determining a maximum number of retransmissions, based on a latency requirement for the group;
    generating, based on the maximum number of retransmissions, different RVs from the encoded information bits in the circular buffer, wherein each RV of the different RVs is based on a corresponding target BLER; and
    transmitting the first RV via a wireless medium.

2. The method of claim 1, further comprising:
    determining $R_T$ according to $R_T=(R_1*a+R_2*b)*\beta$, wherein a, b, and $\beta$ are constants;
    selecting a from a first range of [0, 1];
    selecting b from a second range of [0, 4]; and
    selecting $\beta$ from a third range of [1/3, 4].

3. The method of claim 1, wherein generating an RV, of the different RVs, comprises puncturing a first number of encoded bits in the circular buffer from a starting point of the circular buffer, when a size of the RV is less than the circular buffer size.

4. The method of claim 1, wherein generating an RV, of the different RVs, comprises shortening a second number of encoded bits in the circular buffer from an ending point of the circular buffer, when a size of the RV is less than the circular buffer size.

5. The method of claim 1, wherein generating an RV, of the different RVs, comprises repeating a third number of encoded bits in the circular buffer from a starting point of the circular buffer, when a size of the RV is larger than the circular buffer size.

6. The method of claim 1, wherein a size of the last RV, of the different RVs, is larger than sizes of all of the other different RVs, based on at least one of a BLER requirement or the latency requirement being satisfied.

7. The method of claim 1, wherein the minimum supported coding rate for generating the encoded information bits of 1/3.

8. The method of claim 1, wherein determining the maximum number of retransmissions is further based on a BLER requirement and the latency requirement for the group of K information bits.

9. The method of claim 1, further comprising transmitting the last RV via the wireless medium.

10. An apparatus for wireless communications, comprising:
at least one processor configured to:
determine a target coding rate ($R_T$) for transmitting a group of K information bits, based on a first coding rate ($R_1$) corresponding to a first target block error rate (BLER) for a first transmission of a first redundancy version (RV) of the group and a second coding rate ($R_2$) corresponding to a second target BLER for a last transmission of a last RV of the group,
determine a circular buffer size (N) of a circular buffer for use in transmitting the first RV and the last RV of the group, wherein, in order to determine the circular buffer size (N), the at least one processor is further configured to:
obtain a minimum supported coding rate ($R_{min}$);
calculate a first buffer size ($N_R$) as a minimum integral power of two which is not less than $K/R_{min}$;
calculate a second buffer size ($N_T$) as a minimum integral power of two which is not less than $K/R_T$;
obtain a maximum coded block size ($N_{max}$); and
calculate N as a minimum of $N_R$, $N_T$, and $N_{max}$;
generate encoded information bits from the K information bits using a polar code having a mother code size of N;
write the encoded information bits to the circular buffer;
determine a maximum number of retransmissions, based on a latency requirement for the group;
generate, based on the maximum number of retransmissions, different RVs from the encoded information bits in the circular buffer, wherein each RV of the different RVs is based on a corresponding target BLER; and
transmit the first RV via a wireless medium; and
a memory coupled with the at least one processor.

11. The apparatus of claim 10, wherein the at least one processor is configured to:
determine $R_T$ according to $R_T=(R_1*a+R_2*b)*\beta$, wherein a, b, and $\beta$ are constants;
select a from a range of [0, 1];
select b from a range of [0, 4]; and
select $\beta$ from a range of [1/3, 4].

12. The apparatus of claim 10, wherein, in order to generate an RV of the different RVs, the at least one processor is configured to puncture a first number of encoded bits in the circular buffer from a starting point of the circular buffer, when a size of the RV is less than the circular buffer size.

13. The apparatus of claim 10, wherein, in order to generate an RV of the different RVs, the at least one processor is configured to shorten a second number of encoded bits in the circular buffer from an ending point of the circular buffer, when a size of the RV is less than the circular buffer size.

14. The apparatus of claim 10, wherein, in order to generate an RV of the different RVs, the at least one processor is configured to repeat a third number of encoded bits in the circular buffer from a starting point of the circular buffer, when a size of the RV is larger than the circular buffer size.

15. The apparatus of claim 10, wherein the at least one processor is configured to generate the last RV, of the different RVs, with a size larger than all of the other different RVs, based on at least one of a BLER requirement or the latency requirement being satisfied.

16. The apparatus of claim 10, wherein the at least one processor is configured with the minimum supported coding rate for generating the encoded information bits of 1/3.

17. The apparatus of claim 10, wherein the at least one processor is configured to determine the maximum number of retransmissions further based on a BLER requirement and the latency requirement for the group of K information bits.

18. The apparatus of claim 10, wherein the at least one processor is further configured to transmit the last RV via the wireless medium.

19. An apparatus for wireless communications, comprising:
means for determining a target coding rate ($R_T$) for transmitting a group of K information bits, based on a first coding rate ($R_1$) corresponding to a first target block error rate (BLER) for a first transmission of a first redundancy version (RV) of the group and a second coding rate ($R_2$) corresponding to a second target BLER for a last transmission of a last RV of the group,
means for determining a circular buffer size (N) of a circular buffer for use in transmitting the first RV and the last RV of the group, wherein the means for determining the circular buffer size (N) comprise:
means for obtaining a minimum supported coding rate ($R_{min}$);
means for calculating a first buffer size ($N_R$) as a minimum integral power of two which is not less than $K/R_{min}$;
means for calculating a second buffer size ($N_T$) as a minimum integral power of two which is not less than $K/R_T$;
means for obtaining a maximum coded block size ($N_{max}$); and
means for calculating N as a minimum of $N_R$, $N_T$, and $N_{max}$;
means for generating encoded information bits from the K information bits using a polar code having a mother code size of N;
means for writing the encoded information bits to the circular buffer;
means for determining a maximum number of retransmissions, based on a latency requirement for the group;
means for generating, based on the maximum number of retransmissions, different RVs from the encoded information bits in the circular buffer, wherein each RV of the different RVs is based on a corresponding target BLER; and
means for transmitting the first RV via a wireless medium.

20. A non-transitory computer-readable medium, comprising:
instructions that, when executed by at least one processor, cause the at least one processor to:
determine a target coding rate ($R_T$) for transmitting a group of K information bits, based on a first coding rate ($R_1$) corresponding to a first target block error rate (BLER) for a first transmission of a first redundancy version (RV) of the group and a second coding rate ($R_2$) corresponding to a second target BLER for a last transmission of a last RV of the group,
determine a circular buffer size (N) of a circular buffer for use in transmitting the first RV and the last RV of the group, wherein, in order to determine the circular buffer size (N), the instructions further cause the at least one processor to:

obtain a minimum supported coding rate ($R_{min}$);
calculate a first buffer size ($N_R$) as a minimum integral power of two which is not less than $K/R_{min}$;
calculate a second buffer size ($N_T$) as a minimum integral power of two which is not less than $K/R_T$;
obtain a maximum coded block size ($N_{max}$); and
calculate N a minimum of $N_R$, $N_T$, and $N_{max}$;

generate encoded information bits from the K information bits using a polar code having a mother code size of N;

write the encoded information bits to the circular buffer;

determine a maximum number of retransmissions, based on a latency requirement for the group;

generate, based on the maximum number of retransmissions, different RVs from the encoded information bits in the circular buffer, wherein each RV of the different RVs is based on a corresponding target BLER; and transmit the first RV via a wireless medium.

* * * * *